(12) United States Patent
Soja et al.

(10) Patent No.: US 9,652,430 B2
(45) Date of Patent: May 16, 2017

(54) CONFIGURABLE SERIAL AND PULSE WIDTH MODULATION INTERFACE

(71) Applicant: FREESCALE SEMICONDUCTOR, INC., Austin, TX (US)

(72) Inventors: Richard Soja, Austin, TX (US); Antonio Mauricio Brochi, Campinas (BR)

(73) Assignee: NXP USA, Inc., Austin, TX (US)

( * ) Notice: Subject to any disclaimer, the term of this patent is extended or adjusted under 35 U.S.C. 154(b) by 241 days.

(21) Appl. No.: 14/618,491

(22) Filed: Feb. 10, 2015

(65) Prior Publication Data

US 2016/0232123 A1 Aug. 11, 2016

(51) Int. Cl.
| | | |
|---|---|---|
| *H05K 7/10* | (2006.01) | |
| *G06F 13/42* | (2006.01) | |
| *G06F 13/40* | (2006.01) | |
| *G06F 13/28* | (2006.01) | |
| *G06F 13/16* | (2006.01) | |
| *G06F 13/38* | (2006.01) | |

(52) U.S. Cl.
CPC ...... *G06F 13/4243* (2013.01); *G06F 13/1673* (2013.01); *G06F 13/287* (2013.01); *G06F 13/385* (2013.01); *G06F 13/4022* (2013.01); *G06F 13/4282* (2013.01)

(58) Field of Classification Search
CPC ............. G06F 13/4243; G06F 13/4022; G06F 13/385; G06F 13/1673; G06F 13/4282; G06F 13/287
USPC ......................................................... 710/301
See application file for complete search history.

(56) References Cited

U.S. PATENT DOCUMENTS

| | | |
|---|---|---|
| 5,454,097 A | 9/1995 | Babin |
| 8,175,087 B2 | 5/2012 | Jadus |
| 2004/0049623 A1 | 3/2004 | Barnett |
| 2006/0069820 A1 | 3/2006 | Lee et al. |
| 2009/0198861 A1 | 8/2009 | Lu et al. |
| 2009/0237535 A1* | 9/2009 | Okumura ............... H04N 5/355 348/294 |

(Continued)

OTHER PUBLICATIONS

Robert Bosch GmbH, "GTM-IP_103 Generic Timer Module", GTM-IP Specification, Mar. 31, 2011, pp. 1-483, Revision 1.4.

(Continued)

*Primary Examiner* — Chun-Kuan Lee

(57) ABSTRACT

A reconfigurable register device includes an arrangement of storage elements arranged sequentially in a chain structure. Each storage element stores a state of a binary signal. A combinatorial logic circuitry connectable to the arrangement of storage elements enables the arrangement of storage elements to form a binary synchronous counter. A bypass logic circuitry connectable to the arrangement of storage elements enables the arrangement of storage elements to form a serial shift register. A switching circuitry has a mode signal input terminal receiving a mode signal indicative of at least one of a counter mode and a shift register mode. The switching circuitry is configured to connect the arrangement of storage elements to the combinatory logic circuitry if the mode signal indicates the counter mode, and to connect the arrangement of storage elements to the bypass logic circuitry if the mode signal indicates the shift register mode.

19 Claims, 3 Drawing Sheets

(56) References Cited

U.S. PATENT DOCUMENTS

2014/0244869 A1    8/2014  Adrian et al.

OTHER PUBLICATIONS eTPU Block Guide Rev 3.0, Automotive, Industrial & Multi-market Solutions Group, Freescale Semiconductor, Revised May 30, 2012, pp. 1-320.
FlexIO, Freescale Semiconductor, 2014, pp. 1-47.
Atmel SAM R21E / SAM R21G, SART ARM-Based Wireless Microcontroller, Preliminary Datasheet, 2014 Atmel Corporation, pp. 421-1138, Rev: Atmel-42223A-SAM_R21_Datasheet_7/2014.
UM10503 LPC 43xx ARM Cortex-M4/M0 dual-core microcontroller user manual, pp. 348-381, Rev. 1.4, Sep. 3, 2012, NXP Semiconductors.

* cited by examiner

CONFIGURABLE SERIAL AND PULSE WIDTH MODULATION INTERFACE

BACKGROUND

Field

This disclosure relates generally to processing systems with communication interfaces, and more specifically, to processing systems with an interface that is configurable to communicate serial or pulse width modulation data.

Related Art

As semiconductor technology develops, the size of electronic devices such as transistors is ever-decreasing. At the same time, the capability of processing systems is ever-increasing, placing increasing demands on the number and types of devices with which a processing system can communicate. Yet, as the size of the processing systems decrease, the number of pins or contacts on the external packaging of the processing systems is decreasing, forcing the pins to be shared among interfaces. For example, some types of data may be communicated in a serial format and other types of data may be communicated in a pulse width modulated (PWM) or pulse duration modulation (PDM) format. In some cases, a particular pin may be connectable to either serial or PWM interface circuitry, depending on the application as determined by the purchaser of the processing system. While the circuitry for both types of interfaces is supplied with the device, the interface circuitry that is not required for the particular application goes unused, taking up costly space, complicating routing and multiplexing, and unnecessarily increasing the cost of manufacturing the processing system. This is particularly true when a large number of interfaces are required.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Embodiments of systems, devices and methods disclosed herein provide an interface device that can be configured for data in one of two different types of formats, such as serial or pulse width modulated (PWM) data formats. In the serial configuration, the interface device functions as a serial shift register. In the PWM configuration, the same interface device functions as a timer counter for a PWM driver. A multiplexer is included to switch functionality between the serial shifter register and the timer counter. The same logic gates are used to either shift in data in the serial mode, capture edge time in the PWM mode, or timestamp capture on input transition to transfer data from registers to buffers. The flexibility offered by the reconfigurable interface device lends itself to a software defined I/O architecture, which can reduce die size by removing unused components while retaining flexibility to support many different applications at a lower cost than previously possible.

Figure 1:
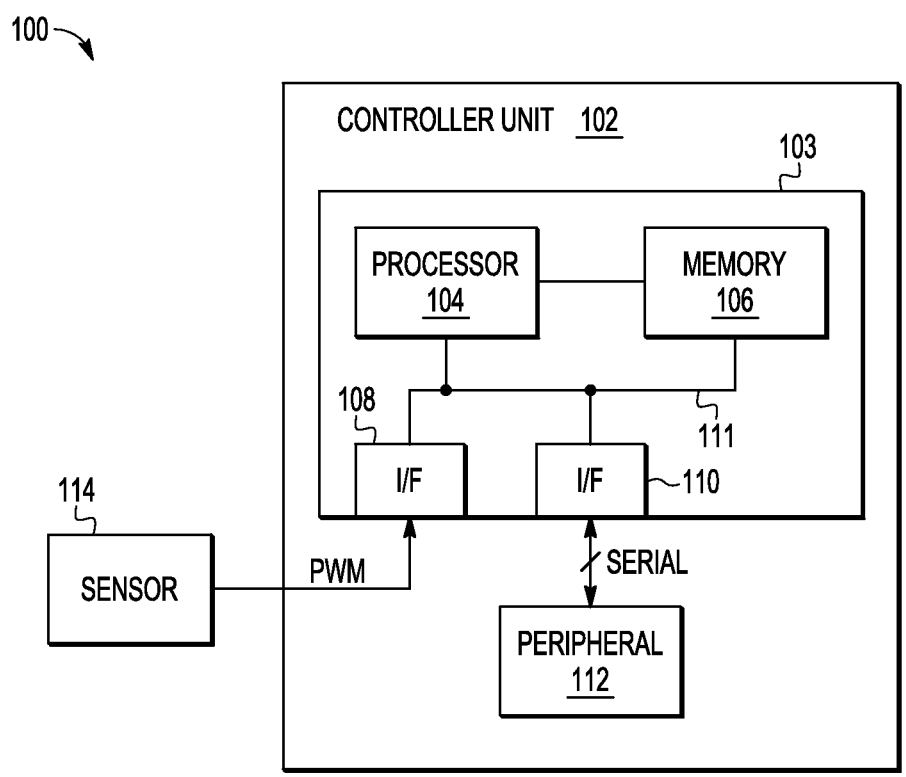
FIG. 1 illustrates a block diagram of a processing system in accordance with an embodiment of the present invention.

FIG. 1 illustrates a block diagram of a processing system 100 in accordance with an embodiment of the present invention that includes a controller unit 102 having a microcontroller unit (MCU) 103 with processor 104, memory, and interface devices 108, 110. A peripheral device 112 is coupled to communicate serial data on a bus with MCU 103 via interface device 110. A sensor 114 external to controller unit 102 is coupled to communicate PWM data with MCU 103 on a bus via interface device 108. Processor 104, memory 106 and interface devices 108, 110 are coupled communicate with one another over bus 111. Processor 104 can also be coupled to communicate directly with memory 106 over a dedicated bus.

Interface devices 108, 110 include the same circuitry, but the circuitry is configured differently based on the type of data to be communicated via interface devices 108, 110. The decision of whether to configure interface devices 108, 110 is typically made when system 100 is being built and does not change throughout the life of system 100. In other cases, however, it is possible to dynamically reconfigure interface devices 108, 110 to handle data in a different format.

Processor 104, memory 106 and interface devices 108, 110 can be implemented as circuitry located on a single integrated circuit or within a same device. Alternatively, processor 102, memory 106 and interface devices 108, 110 as well as peripheral 112 and sensor 114 may include any number of separate integrated circuits or separate devices interconnected with each other. For example, memory 106 may be located on a same integrated circuit as processor 104 or on a separate integrated circuit or located within another peripheral or slave discretely separate from other elements of system 100. Peripheral 112 may be co-located in the same module as SOC 103 and sensor 114 may be located on separate integrated circuits or devices in a location remote from controller unit 102. Also for example, system 100 or portions thereof may be soft or code representations of physical circuitry or of logical representations convertible into physical circuitry. As such, portions of system 100 may be embodied in software or in a hardware description language of any appropriate type.

Memory device 106 can be any suitable memory device(s) such as, for example, Random Access Memory (RAM), Static RAM (SRAM), Magnetoresistive RAM (MRAM), Nonvolatile RAM (NVRAM, such as "FLASH" memory, etc.), and/or Dynamic RAM (DRAM) such as Synchronous DRAM (SDRAM), Double Data Rate RAM, Erasable Programmable ROM (EPROM), an Electrically Erasable Programmable ROM (EEPROM), etc., and any combination thereof, among others.

Communication with serial peripheral 112 includes sending data one bit at a time, sequentially, to processor 104 or memory 106 over computer bus 111. Examples of serial protocols that may be used in system 100 include the Serial Peripheral Interface (SPI), RS-232, RS-422, RS-485, MICROWIRE™, I²C, I²S, among others. Peripheral 112 may include a temperature sensor, pressure sensor, analog to digital converter, touchscreen, video game controller, control device, audio codec, digital potentiometer, digital to analog converter, camera lens, Ethernet device, USB device, USART device, CAN, IEEE 802.15.4 device, IEEE 802.11 device, handheld video game, flash memory, EEPROM, real-time clock, display, multi-media card or secure digital card. Any suitable number of serial peripherals 112 can be included in system 100, with one peripheral 112 being shown for example.

Sensor 112 may be positioned in a remote, noisy environment so a digital pulse width modulated (PWM) output such as the SENT protocol with better noise immunity than an analog signal can be used in these types of applications. Examples of sensor 112 include a tire pressure sensor, engine exhaust sensor, compressor outlet temperature, coolant outlet pressure sensor, battery voltage, and air inlet pressure, among others. Any suitable number of sensors 114 can be included in system 100, with just one sensor 112 being shown for example.

Figure 2:
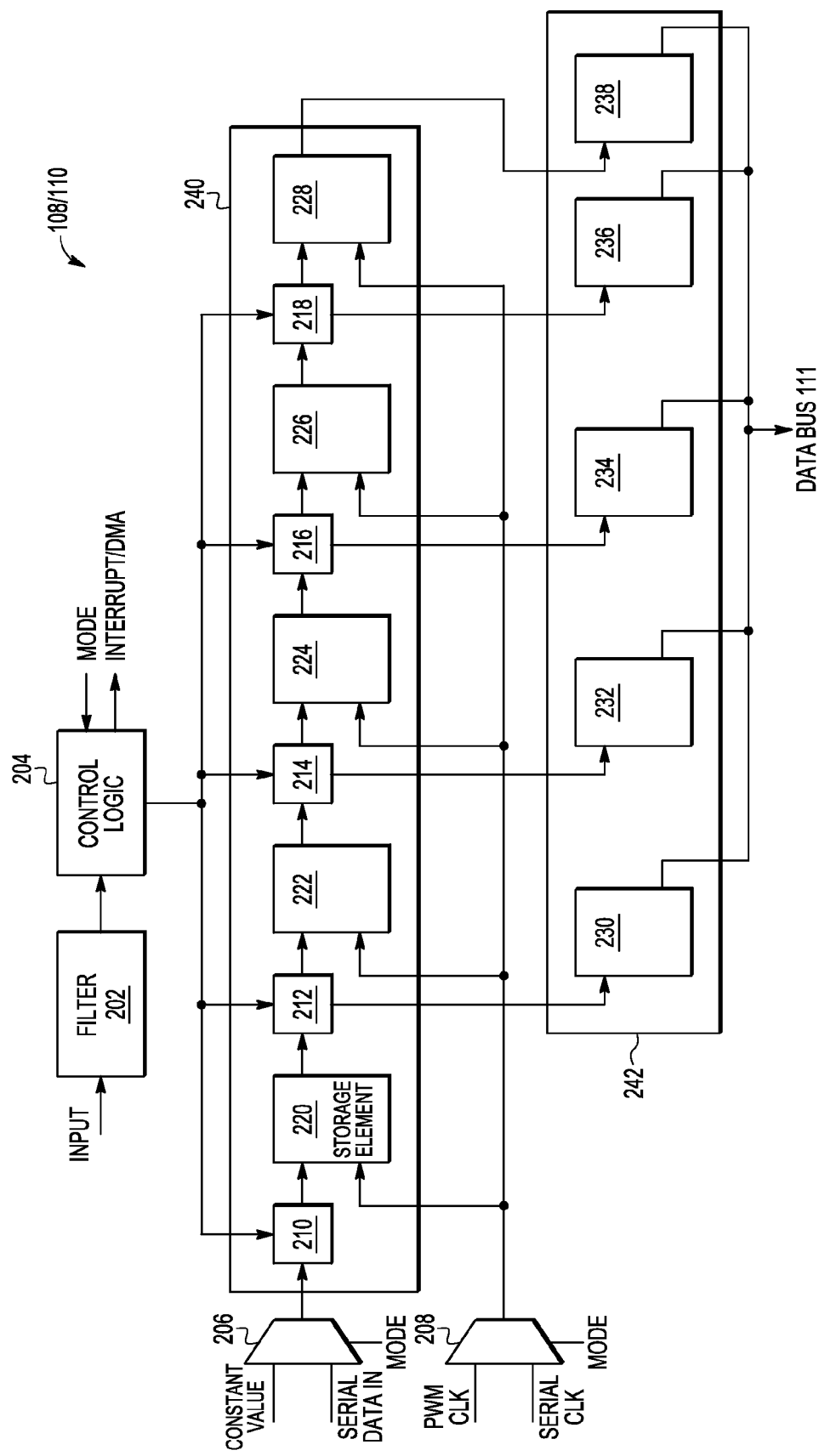
FIG. 2 illustrates a block diagram of an embodiment of an interface device that can be used in the processing system of FIG. 1.

FIG. 2 illustrates a block diagram of an embodiment of an interface device 108, 110 that can be used in the processing system 100 of FIG. 1 that includes filter 202, control logic module 204, multiplexers 206, 208, bypass/combiner logic modules 210-218, and storage elements 220-238. Storage elements 220-238 can be implemented with a flip-flop circuit, storage register or other suitable device for storing a bit of data. Bypass/combiner modules 210-218 and storage elements 220-228 are collectively referred to as register 240. Storage elements 230-238 are collectively referred to as buffer 242.

Multiplexer 206 has a first input coupled to a constant value or alternatively, to an output of a prescaler device, and a second input coupled to receive serial input data. A control input to multiplexer 206 is labeled MODE and is a signal that indicates whether interface 108, 110 is configured in serial or PWM mode. Multiplexer 206 will output the constant value during PWM mode and the serial data during serial mode. The output of multiplexer 206 is coupled as an input to bypass/combiner module 210. Each bypass/combiner module 210-218 has an output coupled to an input of a respective adjacent one of storage elements 220-228. The output of storage element 228 is coupled to an input of storage element 238. Each bypass/combiner module 210-218 has another output coupled to an input of a respective one of storage elements 230-238. An output of each one of storage elements 230-238 is coupled to data bus 111.

Multiplexer 208 has a first input coupled to a PWM clock signal and a second input coupled to a serial clock signal. The output of multiplexer 208 is coupled to another input of each of storage elements 220-228. A control input to multiplexer 208 is labeled MODE and is a signal that indicates whether interface 108, 110 is configured in serial or PWM mode. The MODE signal is set to enable multiplexer 208 to output the PWM clock signal during PWM mode and the serial clock signal during serial mode. The MODE signal also controls multiplexer 208 to output a constant value during PWM mode and the data in signal during serial mode.

When interface device 108, 110 is configured as a serial interface, a master device, such as MCU 103, and a slave device, such as an analog-to-digital converter or other suitable peripheral 112, communicate through a respective interface device, such as interface device 108 or 110 for MCU 103. In interface device 108, 110, a least significant bit of shift register 240 can have an input connected to a pin that functions as a master input/slave output and a most significant bit of shift register 240 can have an output connected to a pin that functions as a master output/slave input. The serial clock signal is connected to a clock input of shift register 240.

A SPI interface of peripheral device 112 can comprise a slave shift register having an input connected to a pin labeled MOSI and an output connected to a pin labeled MISO. The clock input of slave shift register is connected to the serial clock signal. The respective MOSI, MISO and serial clock pins of MCU 103 and slave peripheral device 112 can be connected to one another. Both MCU 103 and slave peripheral device 112 have a data path for entering data to be transmitted to and retrieving received data from their respective shift registers. In addition, both MCU 103 and slave peripheral device 112 can have status register bits for indicating the current status of the interface and control register bits for configuring their respective interface.

During operation in serial mode, MCU 103 sends a bit of data on the MOSI line and the slave peripheral device 112 reads the data from the same line. The slave peripheral device 112 sends a bit of data on the MISO line and the MCU reads the data from the same line. Transmissions have a fixed word size, such as eight bits or other suitable number of bits. The bits of data are shifted to the next adjacent storage element 210-228 with the most significant bit being shifted out while the new least significant bit is shifted into register 240 from multiplexer 206. After the data register has been shifted out, MCU 103 and peripheral slave device 112 have exchanged register values. The exchanged data in register 240 may be transferred to buffer 242 and an interrupt or direct memory access request may be asserted to store the data in buffer 242 in memory 106 or used for some other purpose. If there is more data to exchange, the shift register 240 is loaded with new data and the process repeats. Transmissions may involve any number of clock cycles. When there is no more data to be transmitted, MCU 103 stops toggling the serial clock signal.

When interface device 108, 110 is configured as a PWM interface, a constant data value is provided to register 240 by multiplexer 206. A clock signal PWMCLK is output by multiplexer 208 and provided to storage elements 220-228 by multiplexer 208. A PWM signal typically includes a plurality of PWM cycles, each with two signal transitions, which when viewed over time implement a sequence of pulses. The PWM signal has a characteristic frequency determined by the number of pulses (cycles) provided per unit time. For example, a PWM signal can provide pulses at a frequency of 100 Hz, 25 KHz, or at another desired frequency. Each cycle of a PWM signal includes an active segment, a pulse, and an inactive segment. The term "active segment" refers to that portion of a PWM signal that is at a logic high state. The term "inactive segment" refers to that portion of a PWM signal that is at a logic low state. In the SENT protocol, the pulse width of the signal at the logic high state carries the data.

When register 240 is used as a timer counter in the PWM mode, storage elements 220-228 can be incremented at each rising or falling edge of the clock signal PWMCLK. When the timer counter reaches some predefined value (e.g. 0), control logic module 204 can generate an interrupt. The result is a reasonably accurate time base for executing functionality such as maintaining a reference clock (seconds, minutes, etc.) or performing some operation on a regular basis. The interrupt or a direct memory access request may be asserted to store the timer counter data in buffer 242 in memory 106 or used for some other purpose.

Figure 3:
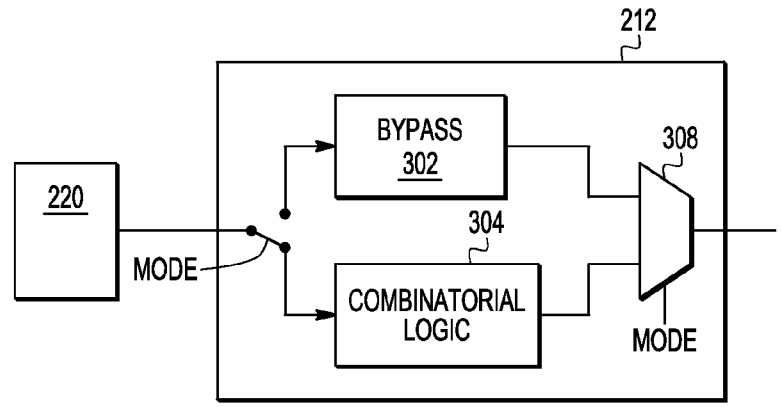
FIG. 3 illustrates a block diagram of an embodiment of a bypass/combiner module that can be used in the interface device of FIG. 2.

Referring to FIGS. 2 and 3, FIG. 3 illustrates a block diagram of an embodiment of a bypass/combiner module 212 that can be used in the interface device 108, 110 of FIG. 2. Bypass/combiner module 212 includes bypass unit 302 and combinatorial logic unit 304. Signals are input to bypass unit 302 and combinatorial logic unit 304 from control logic 204 and storage element 220. Bypass unit 302 operates during serial mode, and combinatorial logic unit 304 operates during PWM mode. The outputs of bypass unit 302 and combinatorial logic unit 304 are coupled to multiplexer 308 that provides the output of bypass unit 302 to storage element 222 during serial mode, and the output of combinatorial logic unit 304 to storage unit 222 during PWM mode. A similar bypass/combiner module 212 can be used for bypass/combiner modules 210 and 214-218.

Bypass unit 302 can simply connect the storage element 220 to storage element 222 without affecting the data in storage elements 220, 222. When used as a synchronous timer counter, every storage element 220-228 in register 240 receives the exact same clock pulse at the same time. During the counting operation, a particular storage element 220-228 may be enabled to toggle based on whether or not all preceding flip-flop outputs are high. The preceding flip-flops may then also be toggled or reset to output low until the counter reaches a value where each flip-flop is subsequently toggled independently as part of the counting sequence.

Figure 4:
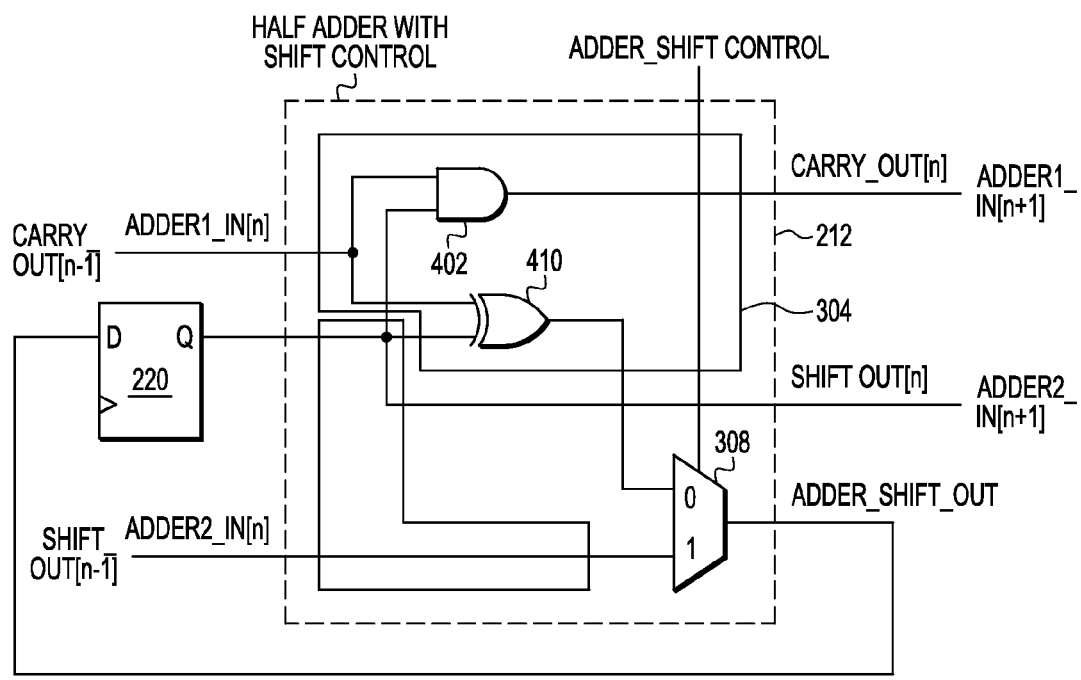
FIG. 4 illustrates a block diagram with further detail of the embodiment of the bypass/combiner module of FIG. 3.

Referring to FIGS. 2, 3 and 4, FIG. 4 illustrates a block diagram with further detail of the embodiment of the bypass/combiner module of FIG. 3. Combinatorial logic 304 includes AND gate 402 and exclusive OR (XOR) gate 410. AND gate 402 includes a first input coupled to an ADDER_IN1($n$) signal that is output as an CARRY_OUT (n−1) signal by a similar combinatorial logic module 304 in bypass/combiner module 210. A second input to AND gate 402 is the output of storage element 220. An output of AND gate 402 is a CARRY_OUT(n) signal that is provided as an ADDER_IN1($n$+1) signal to a similar combinatorial logic module 304 in bypass/combiner module 214.

XOR gate 410 has a first input coupled to the ADDER_IN1($n$) signal and a second input coupled to the output (shown as a ADDER_IN2($n$) signal) of storage element 220. The output of XOR gate 410 is provided as a first input to multiplexer 308. A second input to multiplexer 308 is coupled to an ADDER2_IN(n) signal that is output as a SHIFT_OUT(n−1) signal by bypass/combiner module 210. An output ADDER_SHIFT_OUT of multiplexer 308 is coupled to a data input of storage element 220.

During operation in the serial mode, bypass/combiner module 212 is configured as a shift register with ADD_SHIFT control signal being supplied as a control input to multiplexer 308 to output the ADDER2_IN(n) signal. The serial data input is shifted through storage elements 220-228. After one complete word is captured, i.e. after a number of shift-in cycles equal to the number of bits in the word, the contents of storage elements 220-228 are transferred to buffer 242.

In the timer counter mode, bypass/combiner module 212 is configured to behave as a timer to measure the interval between two edges of the input signal from multiplexer 206. The timer is re-initialized between edges, using, for example, a reset signal provided by control logic 204 to storage elements 220-228. The ADD_SHIFT control signal to multiplexer 308 sets the output to the output of XOR gate 410. In the timer counter mode, on each clock cycle, the content of storage elements 220-228 are incremented when a "first" valid edge of the input signal is detected and disabled when a "second" valid edge is detected. Thus the counter value corresponds to the time interval between the two inputs. The timer value is transferred to buffer 242 on a valid input edge. After that the counter is re-initialized. On a second input edge the process repeats.

By now it should be appreciated that in some embodiments, there has been provided a reconfigurable register device that can comprise an arrangement of storage elements (220, 222, 224, 226, 228) arranged sequentially in a chain structure. Each storage element (220, 222, 224, 226, 228) can be configured for storing a state of a binary signal. A combinatorial logic circuitry (304) can be connectable to the arrangement of storage elements. The combinatorial logic circuitry (304) can be configured to enable the arrangement of storage elements to form a binary synchronous counter. A bypass logic circuitry (302) can be connectable to the arrangement of storage elements. The bypass logic circuitry (302) can be configured to enable the arrangement of storage elements to form a serial shift register. A switching circuitry (306) can have a mode signal input terminal for receiving a mode signal indicative of at least one of a counter mode and a shift register mode. The switching circuitry (306) can be configured to selectively connect the arrangement of storage elements (220, 222, 224, 226, 228) to the combinatory logic circuitry (304) if the mode signal indicates the counter mode, and to selectively connect the arrangement of storage elements (220, 222, 224, 226, 228) to the bypass logic circuitry (302) if the mode signal indicates the shift register mode.

In another aspect, the reconfigurable register device can further comprise a clock signal input connected to each of the storage elements each having a clock input terminal for receiving a clock signal. Each storage element can further comprise a signal input terminal and a signal output terminal and can be configured to capture a binary signal supplied to the signal input terminal at at least one of a raising edge and falling edge of each clock cycle, and to present a stored state of the previously captured signal state at the output terminal, In another aspect, the combinatorial logic circuitry can be configured to increase a binary value represented by the states stored in storage elements at least by one at each clock cycle. The bypass logic (302) can be configured to connect the output terminal of each storage element to the input terminal of the storage element, which is next in sequence.

In another aspect, the storage elements (220, 222, 224, 226, 228) can be clock-triggered storage elements.

In another aspect, the storage elements (220, 222, 224, 226, 228) can be flip-flops.

In another aspect, the combinatory logic circuitry can be configured to enable the arrangement of storage elements to form one of a synchronous serial counter and a synchronous parallel counter.

In another embodiment, a reconfigurable interface device (108, 110) can comprise an arrangement of storage elements (220, 222, 224, 226, 228). The storage elements (220, 222, 224, 226, 228) can be arranged sequentially in a chain structure and configured for storing a state of a binary signal. A combinatorial logic circuitry (304) can be connectable to the arrangement of storage elements. The combinatorial logic circuitry (304) can be configured to enable the arrangement of storage elements to form a binary synchronous counter. A bypass logic circuitry (302) can be connectable to the arrangement of storage elements. The bypass logic circuitry (302) can be configured to enable the arrangement of storage elements to form a serial shift register. A switching circuitry (306) can have a mode signal input terminal for receiving a mode signal indicative of at least one of a counter mode and a shift register mode to selectively connect the arrangement of storage elements (220, 222, 224, 226, 228) to the combinatory logic circuitry (304) if the mode signal indicates the counter mode, and to selectively connect the arrangement of storage elements (220, 222, 224, 226, 228) to the bypass logic circuitry (302) if the mode signal indicates the shift register mode. An input signal switching unit (206) having a first input terminal for receiving a predefined time-invariant signal, a second input terminal for receiving a stream of binary data signals varying in time, and an output terminal to which one of the time-invariant signal and binary data signals is selectively transmitted based on the mode signal. The input signal switching unit (206) can be configured to selectively present the time-invariant signal at an output terminal if the mode signal indicates the counter mode, and to selectively present the data signal stream at an output terminal if the mode signal indicates the shift register mode. The output terminal of the input signal switching unit (206) can be connected to a first storage element of the arrangement of storage elements (220, 222, 224, 226, 228) in the sequence of the chain structure.

In another aspect, the reconfigurable interface device can further comprise a clock signal switching element (208) having a first input terminal for receiving a counter clock signal, a second input terminal for receiving a shift clock signal, and an output terminal to which one of the inputted signals is selectively transmitted based on the mode signal. The clock signal switching unit (208) can be configured to selectively present the time-invariant signal if the mode signal indicates the counter mode, and to present the data signal stream at an output terminal if the mode signal indicates the shift register mode.

In another aspect, the input signal switching unit (206) can be a multiplexer.

In another aspect, the clock signal switching unit (208) can be a multiplexer.

In another aspect, the reconfigurable interface device can further comprise a buffer comprising a number of storage cells (230, 232, 234, 236, 238) corresponding to the number of storage elements (220, 222, 224, 226, 228) in the arrangement. Each storage cell (230, 232, 234, 236, 238) can be configured for storing a state of a binary signal. The buffer can be connected to the arrangement of storage elements (220, 222, 224, 226, 228), to store the state of each storage element of the arrangement in a respective storage cell of the buffer. A control logic circuitry (204) can be configured to load of the states of the storage elements into the respective storage cells.

In another aspect, each storage cell (230, 232, 234, 236, 238) is connected in parallel to the respective storage element (220, 222, 224, 226, 228).

In another aspect, the control logic circuitry (204) has a mode input terminal to receive the mode signal and a signal input terminal to receive a stream of signals with varying pulse widths. The control logic circuitry (204) can be configured to detect a signal transition in the received signal stream, and to trigger the loading of the state of each storage element of the arrangement in the respective storage cell of the buffer upon the detected signal transition.

In another aspect, the control logic circuitry (204) can be configured to reset storage elements of the arrangement to default states after loading the state of each storage element of the arrangement in the respective storage cell of the buffer upon the detected signal transition.

In another aspect, the stream of signals with varying pulse widths can be one of a pulse width modulated signal and a pulse code modulated signal.

In another aspect, the arrangement of storage elements can comprise at least two groups of storage elements. The storage elements of each group can be arranged sequentially in a chain structure. The storage elements of each group can form a separate binary synchronous counter.

In another aspect, the control logic circuitry (204) can have a mode input terminal to receive the mode signal and an indication input terminal to an indication signal relating to a frame. The control logic circuitry (204) can be configured to trigger the loading of the state of each storage element of the arrangement in the respective storage cell of the buffer upon receiving an indication signal relating to a frame.

In another aspect, the stream of binary data signals varying in time can be a bit stream which is received in synchronicity with the shift clock signal.

In still other embodiments, a method can comprise receiving a mode signal indicative of at least one of a counter mode and a shift register mode, and selectively connecting an arrangement of storage elements (220, 222, 224, 226, 228) to a combinatory logic circuitry (304) if the mode signal indicates the counter mode. The combinatorial logic circuitry (304) is connectable to the arrangement of storage elements, wherein the storage elements (220, 222, 224, 226, 228) are arranged sequentially in a chain structure and each storage element (220, 222, 224, 226, 228) is configured for storing a state of a binary signal. The combinatorial logic circuitry (304) can be configured to enable the arrangement of storage elements to form a binary synchronous counter. The arrangement of storage elements (220, 222, 224, 226, 228) can be selectively connected to a bypass logic circuitry (302) if the mode signal indicates the shift register mode. The bypass logic circuitry (302) can be connectable to the arrangement of storage elements. The bypass logic circuitry (302) can be configured to enable the arrangement of storage elements to form a serial shift register.

In another aspect, the method can further comprise selectively supplying a time-invariant signal to a first storage element of the arrangement if the mode signal indicates the counter mode, and selectively supplying the data signal stream to the first storage element of the arrangement if the mode signal indicates the shift register mode. The first storage element of the arrangement of storage elements (220, 222, 224, 226, 228) can be the first storage element thereof with respect to the sequence of the chain structure.

Because the apparatus implementing the present disclosure is, for the most part, composed of electronic components and circuits known to those skilled in the art, circuit details will not be explained in any greater extent than that considered necessary as illustrated above, for the understanding and appreciation of the underlying concepts of the present disclosure and in order not to obfuscate or distract from the teachings of the present disclosure.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the disclosure. Of course, the description of the architecture has been simplified for purposes of discussion, and it is just one of many different types of appropriate architectures that may be used in accordance with the disclosure. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In one embodiment, system 100 is a computer system such as an embedded computer system or System on a Chip (SoC). Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

Although the disclosure is described herein with reference to specific embodiments, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to disclosures containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A reconfigurable register device, comprising:
an arrangement of storage elements,
   wherein the storage elements are arranged sequentially in a chain structure,
   wherein each of the storage elements is configured for storing a state of a binary signal;
a combinatorial logic circuitry connectable to the arrangement of storage elements, wherein the combinatorial logic circuitry is configured to enable the arrangement of storage elements to form a binary synchronous counter;
a bypass logic circuitry connectable to the arrangement of storage elements, wherein the bypass logic circuitry is configured to enable the arrangement of storage elements to form a serial shift register; and
a switching circuitry having a mode signal input terminal for receiving a mode signal indicative of at least one of a counter mode and a shift register mode, wherein the switching circuitry is configured to selectively connect the arrangement of storage elements to the combinatorial logic circuitry if the mode signal indicates the counter mode, and to selectively connect the arrangement of storage elements to the bypass logic circuitry if the mode signal indicates the shift register mode;
a buffer comprising a number of storage cells corresponding to the number of storage elements in the arrangement, wherein each of the storage cells is configured for storing a state of a binary signal, the buffer is connected to the arrangement of storage elements and is configured to store the state of each storage element of the arrangement in a respective storage cell of the buffer; and
a control logic circuitry configured to load of the states of the storage elements into the respective storage cells.

2. The reconfigurable register device of claim 1, further comprising:
a clock signal input connected to each of the storage elements each having a clock input terminal for receiving a clock signal, wherein each storage element further comprises a signal input terminal and a signal output terminal and is configured to capture a binary signal supplied to the signal input terminal at at least one of a raising edge and falling edge of each clock cycle, and to present a stored state of the previously captured signal state at the output terminal.

3. The reconfigurable register device of claim 2,
wherein the combinatorial logic circuitry is configured to increase a binary value represented by the states stored in storage elements at least by one at each clock cycle, and the bypass logic is configured to connect the output terminal of each storage element to the input terminal of the storage element, which is next in sequence.

4. The reconfigurable register device of claim 1,
wherein the storage elements are clock-triggered storage elements.

5. The reconfigurable register device of claim 1,
wherein the storage elements are flip-flops.

6. The reconfigurable register device of claim 1,
wherein the combinatory logic circuitry is configured to enable the arrangement of storage elements to form one of a synchronous serial counter and a synchronous parallel counter.

7. A reconfigurable interface device, comprising:
an arrangement of storage elements arranged sequentially in a chain structure, wherein each storage element is configured for storing a state of a binary signal;
a combinatorial logic circuitry connectable to the arrangement of storage elements,
    wherein the combinatorial logic circuitry is configured to enable the arrangement of storage elements to form a binary synchronous counter;
a bypass logic circuitry connectable to the arrangement of storage elements,
    wherein the bypass logic circuitry is configured to enable the arrangement of storage elements to form a serial shift register;
a switching circuitry having a mode signal input terminal for receiving a mode signal indicative of at least one of a counter mode and a shift register mode,
    wherein the switching circuitry is configured to selectively connect the arrangement of storage elements to the combinatory logic circuitry if the mode signal indicates the counter mode, and to selectively connect the arrangement of storage elements to the bypass logic circuitry if the mode signal indicates the shift register mode;
an input signal switching unit having a first input terminal for receiving a predefined time-invariant signal, a second input terminal for receiving a stream of binary data signals varying in time, and an output terminal to which one of the time-invariant signal and binary data signals is selectively transmitted based on the mode signal, wherein the input signal switching unit is configured to selectively present the time-invariant signal at an output terminal if the mode signal indicates the counter mode, and to selectively present the data signal stream at an output terminal if the mode signal indicates the shift register mode,
wherein the output terminal of the input signal switching unit is connected to a first storage element of the arrangement of storage elements in the sequence of the chain structure;
a buffer comprising a number of storage cells corresponding to the number of storage elements in the arrangement, wherein each of the storage cells is configured for storing a state of a binary signal, the buffer is connected to the arrangement of storage elements and is configured to store the state of each storage element of the arrangement in a respective storage cell of the buffer; and
a control logic circuitry configured to load of the states of the storage elements into the respective storage cells.

8. The reconfigurable interface device of claim 7, further comprising:
a clock signal switching element having a first input terminal for receiving a counter clock signal, a second input terminal for receiving a shift clock signal, and an output terminal to which one of the inputted signals is selectively transmitted based on the mode signal, wherein the clock signal switching unit is configured to selectively present the time-invariant signal if the mode signal indicates the counter mode, and to present the data signal stream at an output terminal if the mode signal indicates the shift register mode.

9. The reconfigurable interface device of claim 7, wherein the input signal switching unit is a multiplexer.

10. The reconfigurable interface device of claim 8, wherein the clock signal switching unit is a multiplexer.

11. The reconfigurable interface device of claim 7, wherein each storage cell is connected in parallel to the respective storage element.

12. The reconfigurable interface device of claim 7, wherein the control logic circuitry has a mode input terminal to receive the mode signal and a signal input terminal to receive a stream of signals with varying pulse widths and is configured to detect a signal transition in the received signal stream, and to trigger the loading of the state of each storage element of the arrangement in the respective storage cell of the buffer upon the detected signal transition.

13. The reconfigurable interface device of claim 12, wherein the control logic circuitry is configured to reset storage elements of the arrangement to default states after loading the state of each storage element of the arrangement in the respective storage cell of the buffer upon the detected signal transition.

14. The reconfigurable interface device of claim 12, wherein the stream of signals with varying pulse widths is one of a pulse width modulated signal and a pulse code modulated signal.

15. The reconfigurable interface device of claim 7, wherein the arrangement of storage elements comprises at least two groups of storage elements, wherein the storage elements of each group is arranged sequentially in a chain structure and form a separate binary synchronous counter.

16. The reconfigurable interface device of claim 7, wherein the control logic circuitry has a mode input terminal to receive the mode signal and an indication input terminal to an indication signal relating to a frame, wherein the control logic circuitry is configured to trigger the loading of the state of each storage element of the arrangement in the respective storage cell of the buffer upon receiving an indication signal relating to a frame.

17. The reconfigurable interface device of claim 16, wherein the stream of binary data signals varying in time is a bit stream which is received in synchronicity with the shift clock signal.

18. A method, comprising:
receiving a mode signal indicative of at least one of a counter mode and a shift register mode;
selectively connecting an arrangement of storage elements to a combinatory logic circuitry if the mode signal indicates the counter mode, wherein
    the combinatorial logic circuitry is connectable to the arrangement of storage elements,
    the storage elements are arranged sequentially in a chain structure, wherein each storage element is configured for storing a state of a binary signal, and
    the combinatorial logic circuitry is configured to enable the arrangement of storage elements to form a binary synchronous counter; and
selectively connecting the arrangement of storage elements to a bypass logic circuitry if the mode signal indicates the shift register mode, wherein
    the bypass logic circuitry is connectable to the arrangement of storage elements, and
    the bypass logic circuitry is configured to enable the arrangement of storage elements to form a serial shift registers;
storing a state of a binary signal in a buffer comprising a number of storage cells corresponding to the number of storage elements in the arrangement, wherein the buffer is connected to the arrangement of storage elements and is configured to store the state of each storage element of the arrangement in a respective storage cell of the buffer; and loading of the states of the storage elements into the respective storage cells.

19. The method of claim 18, further comprising selectively supplying a time-invariant signal to a first storage element of the arrangement if the mode signal indicates the counter mode; and selectively supplying the data signal stream to the first storage element of the arrangement if the mode signal indicates the shift register mode, wherein the first storage element of the arrangement of storage elements is the first storage element thereof with respect to the sequence of the chain structure.

\* \* \* \* \*